US006934892B2

(12) United States Patent
Misaka et al.

(10) Patent No.: US 6,934,892 B2
(45) Date of Patent: Aug. 23, 2005

(54) COMPUTING SYSTEM CONSTRUCTION METHOD UNDER EXECUTION ENVIRONMENT TO BE DEPENDENT ON OS

(75) Inventors: Satoshi Misaka, Kokubunji (JP); Kazuo Aisaka, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 490 days.

(21) Appl. No.: 10/075,381

(22) Filed: Feb. 15, 2002

(65) Prior Publication Data

US 2003/0061543 A1 Mar. 27, 2003

(30) Foreign Application Priority Data

Sep. 25, 2001 (JP) ........................................ 2001-290986

(51) Int. Cl.[7] .............................................. G06F 11/00
(52) U.S. Cl. ........................... 714/48; 714/38; 717/147
(58) Field of Search ............................. 714/48, 38, 37; 717/147, 136; 719/319; 703/27

(56) References Cited

U.S. PATENT DOCUMENTS

| 6,523,137 | B1 | * | 2/2003 | Stone | .......................... | 714/38 |
| 2004/0153834 | A1 | * | 8/2004 | Oshima | ...................... | 714/38 |
| 2004/0226004 | A1 | * | 11/2004 | Oldman | ...................... | 717/136 |

| 2005/0015750 | A1 | * | 1/2005 | Bley et al. | ................... | 717/127 |

FOREIGN PATENT DOCUMENTS

JP          8-63363          3/1996

* cited by examiner

*Primary Examiner*—Robert Beausoliel
*Assistant Examiner*—Marc Duncan
(74) *Attorney, Agent, or Firm*—Mattingly, Stanger, Malur & Brundidge, P.C.

(57) ABSTRACT

On the occasion of returning an error code to an application program to be executed under different execution environments of a computing system, it is requested to fully utilize a system of the existing instruction set to improve the ROM efficiency in the implementation of its common code and to eliminate useless insertion of instruction.

For this purpose, in the present invention, a common error code to be returned, from the program to be used to be independent on different OS, to the execution program corresponding to the application program is determined as a value in the range of numerical value to be set with the instruction set of CPU and the defined instruction to load immediate value and thereby the common error code is held within the instruction code of the instruction to load immediate value. Particularly, a value of common error code is determined within the range where the MSB of the setting part of the instruction to load immediate value becomes zero (0).

4 Claims, 14 Drawing Sheets

FIG.13

| ERROR CODE | VALUE | MEANING |
|---|---|---|
| WRP_OK | 0X 00 | REGULAR |
| WRP_ER_STACK | 0X 01 | STACK ERROR |
| WRP_CREATE | 0X 03 | FAILURE OF CREATING TASK |
| WRP_ER_MEM | 0X 05 | MEMORY ERROR |
| WRP_ER_OTHER | 0X 06 | OTHER ERROR |
| WRP_ER_DELETE | 0X 0D | TO BE DISABLE FROM EXECUTION FOR DELETING TASK |

0X :HEXADECIMAL VALUE

COMPUTING SYSTEM CONSTRUCTION METHOD UNDER EXECUTION ENVIRONMENT TO BE DEPENDENT ON OS

FIELD OF THE INVENTION

The present invention relates to a computing system construction method under an execution environment dependent on the operating system (OS). More specifically, the present invention is directed to a computing system construction method enabling installation of a computing system which assures excellent memory efficiency of an executable program without deterioration of execution rate in the event of returning a common error code under an execution environment dependent on OS.

BACKGROUND OF THE INVENTION

In order to have a computer system executable under different environments dependent on OS, various technologies have been proposed to realize easier development and transportation.

As an example of such technology, an official gazette of the Japanese Published Unexamined Patent Application No. HEI 8-63363 discloses a "Virtual Execution Environment System".

This virtual execution environment system will be explained below with reference to FIG. 1.

A body of program 11 and replacement programs 12a and 12b are provided as the source codes of application software generated by a user (programmer).

The body of program is a source code which is different depending on the object of application software, while the replacement program 12a or 12b replaces an item of information described in the body of program 11 to an adequate item of information corresponding to an apparatus type of existing operating system 60a or 60b, respectively, to realize the virtual execution environment.

For execution by the operating system 60a or 60b, replacement information described in the body of program 11 and replacement program 12a or 12b is converted to an executable program 30a or 30b by utilizing a compiler for the existing operating system and thereafter such executable program is executed with an execution part 22a or 22b. A translation part 21a or 21b translates such replacement information to an executable program which may be executed on the virtual execution environment.

In this case, when the source program is to be described in C language, the replacement program 12a or 12b can utilize macro definition which is processed as a preprocessor of the complier.

As explained above, it is possible to operate the executable program 30a or 30b generated for various environments on the existing operating system 60a or 60b without any modification of the body of program 11 of the application software 10.

Next, construction of a computing system based on the existing technique under an execution environment dependent on OS and execution of process with the same computing system will be explained in detail with reference to FIG. 2.

FIG. 2 shows a concept for software development under the execution environment dependent on OS.

The development of an application in C language is assumed here. The common function with C programming language 102 is provided to a part corresponding to the replacement program 12a or 12b in FIG. 1.

A computing system-A 105a and a computing system-B 105b are provided as shown in FIG. 2 and the environment to execute the program is defined as an execution environment-A 104a and an execution environment-B 104b. The execution environment-A 104a is composed of hardware-A 106a and an OS-A 107a for controlling the hardware and intermediating between the application program and hardware.

A body 100 of application is a source code for a user to describe individual applications and the common function 102 is called to receive the offered function from the system. It should be noted here that a user who will describe the application 100 itself is required only to be aware of a common function interface 101 and is free from execution to change the coding depending on individual environment. Therefore, compatibility is maintained in the source level for the application 100 itself.

The common function 102 is provided as a library function for development and the common function interface 101 is disclosed for users. The common function 102 is used as explained above to provide a unified interface independent of the environment to users.

An execution format is generated here by operation of compiling and linking for a source described with a user. In this case, the compiling is executed with a compilerA 108a under the execution in the execution environment-A 104a, while the compiling is executed with a compiler B 108b under the execution in the execution environment-B 104b.

Moreover, in the same manner, the execution environment program-A 103a is linked with a linker A 109a for execution environment-A. The execution environment program-A 103a is executed in the execution environment-A 104a and the system of the OS-A 107a is called. Such a system call is also executed for the execution environment-B 104b.

Operation of compiling and linking is also executed for the application body 100 as the source code of a user. In this example, the execution program-A 110a and execution program-B 110b are respectively generated for the execution environment-A 104a and execution environment-B 104b.

A module obtained by compiling the common function 102, execution environment program-A 103a and execution environment program-B 103b become the programs to be used to be independent on different OSs, OS-A 111a and OS-B 111b, which may be executed respectively in the intrinsic execution environments through the operation of compiling and linking.

Next, operations of the executable program generated as explained above under the execution environment of the computing system will be summarized below.

For example, the execution program-A 110a is executed as follows under the execution environment-A. Namely, the execution program-A 110a calls the program to be used to be independent on different OS-A 111a. This program to be used to be independent on OS-A 111a is a module provided to absorb a difference of OS observed from the application to provide a common interface. The called program to be used to be independent on different OS-A 111a calls a system to realize the function of OS-A 107a and realize the function of the desired OS with the hardware-A 106a. Upon completion of the operation of the hardware-A 106a, the OS-A 107a returns the control to the program to be used to be independent on different OS-A 111a. Finally, the program to be used to be independent on different OS-A 111a returns the control to the execution program-A 110a.

Similar operations are executed when the execution program-B 110b is executed under the execution environment-B 104b, but since the execution environment-B 104b is provided for the computing system-B, the OS as the precondition and the hardware are different. For example, the hardware-A 106a and hardware-B 106b are different in machine language system, and the execution environment programs-A 103a and B 103b are different in system call for calling the function of the OS.

A common interface 102 transfers a common error code not dependent on different OS 107 to the body of program 11 by calling almost the same OS function from the body of program 11 even when it is loaded on different OS, without giving any modification to the body of program 11. Here, the common error code means the error code not dependent on the environment when it is observed from the application that may be achieved in direct from or by modifying the error code dependent on OS using the program to be used to be independent on different OS.

The OS function can be called and the program can also be described with the common method by defining the specification of the common interface 102 and thereby the body of program 11 can be reused easily for the other application software.

The prior art described above relates to the system for developing and executing application software under different environments of the computing system.

Here, it will be explained with reference to FIG. 3 to FIG. 7 that a problem is generated in the use of an error code during operation in the prior art.

FIG. 3 shows a relationship among data, program code, register and memory or the like in the computing system-A 105a.

It has already been described that the computing system-A 105a is structured with a hardware-A 106a, an OS-A 107a, a program to be used to be independent on different OS and an execution program-A 110a.

As shown in FIG. 3, a CPU-A 121a for executing an instruction, a ROM-A 122a and a RAM-A 102a for storing program and data are mounted on the hardware-A 106a. The CPU-A 121a includes a plurality of general registers.

These general registers include, depending on respective application purposes, a register for parameter of function 124 for transferring a parameter described with a user, a register for temporal variable 125 for storing a temporal variable, a register for return value 126 for returning a return value of function with C programming language and a register used by a programmer freely 127 provided for the programmer.

Moreover, the CPU-A 121a includes a stack pointer register 128 indicating an address in the memory area of stack 130 contained in the RAM-A 123a and a program counter register 129 indicating the next address of the instruction being executed of the program stored on the ROM-A 122a or RAM-A 123a.

In general, when a compiler such as the C programming language assigns a general register of CPU to data or parameter, a register, classified roughly, which is qualified to be used by a user (namely, it is allowed to process in direct the value of register with an assembler) by assuring existence of the value before or after a certain function is called for a user and a general register used on the system can be considered as that explained above. These general registers do not insure, for a user, existence of the value before or after a certain function is called.

Here, the register for parameter of function 124, register for temporal variable 125 and register for return value 126 are used as the registers which do not assure a constant value before and after the time when the desired function with C programming language is called. Moreover, the register used by programmer freely 127, stack pointer register 128 and program counter register 129 are used as the registers to assure a constant value.

The register for parameter of function 124, register for temporal variable 125, register for return value 126, register used by programmer freely 127 and stack pointer register 128 are usually given enough register length enough processing the same value, respectively.

Here, it is assumed that the execution program code-A 131a as the program code of the execution program-A 110a, program code to be used to be independent on different OS-A 132a as the program code of the program to be used to be independent on different OS-A 111a and OS program code-A 133a as the program code of the OS-A 107a are stored on the ROM-A 122a. These program codes are compiled, as shown in FIG. 2, with the compiler-A 108a for the execution environment-A. In order to execute the execution program-A 110a, the instruction words of the execution program code-A 131a are interpreted and executed. Moreover, in the same manner, in order to execute the program to be used to be independent on different OS-A 111a, the instruction words of the program code to be used to be independent on different OS-A 132a are interpreted and executed, while in order to execute the program of OS-A 107a, the OS program code-A 133a is interpreted and executed, respectively.

In addition, a constant area-A 134a is reserved on the ROM-A 122a in view of storing the error code 135a to be dependent on OS in accordance with the function of the OS-A 107a and the common error code 136 provided with the program to be used to be independent on different OS.

Further, as explained above, the stack area 130 is also reserved on the RAM-A 123a.

For execution of the execution program code-A 131a, the instruction words starting from the start instruction address 137 of execution program and ending at the end instruction address 138 of execution program are interpreted and executed with the CPU-A 121a. In this case, the program counter register 129 designates the storing address of a machine instruction to be operated following the machine instruction operated at present and the stack pointer register 12B designates the desired memory address in the stack area 130 used in current.

The program counter register 129 designates, upon reaching at the entrance of the common interface 102 programmed within the execution program code A 131a, the leading address of the program to be used to be independent on different OS corresponding to the common interface 102 with the instruction of jump 139 for execution from the CPU-A 121a.

In the same manner, the program counter register 129 designates, upon reaching at the entrance of the system call of OS-A 107a programmed within the program to be used to be independent on different OS-A 132a, the leading address of the OS program code-A 133a corresponding to such system call with the instruction of software interruption or instruction of jump 140 for execution from the CPU-A 121a.

When the OS program code-A 133a completes execution of predetermined functions, it stores a return value to the register for return value 126 using the error code 135a to be dependent on OS-A 107a in order to transfer the completion of execution to the program to be used to be independent on different OS-A 111a. The error code 135a to be dependent on OS-A 107a is information indicating whether the program of OS-107a terminates normally or not and what failure is generated within the program of OS-107a or within the computing system-A 105a.

When the return value is stored with the program code-A 133a of OS-A, the program counter register 129 designates a return address 142 to the program code to be used to be independent on different OS-A 132a and transfers control to the program code to be used to be independent on different OS-A 132a by executing an instruction of return 141.

When control is returned to the program code 132a to be used to be independent on different OS-A 132a, the error code 135a to be dependent on OS-A 107a is stored as the return value in the register for return value 126. On the other hand, a certain error code 135a to be dependent on OS-A 107a within the ROM-A 122a is loaded to the register for temporal variable 125 to compare the values stored in the register for return value 126 and the register for temporal variable 125 using an instruction of comparison 144. When the exactly equivalent error code is detected, the common error code 136 corresponding to such exactly equivalent error code is stored, when the control is returned to the execution program code-A 131a, to the register for return value 126 from the program code to be used to be independent on different OS-A 132a and it is then transferred to the execution program-A 110a. If such equivalent error code is not detected, the next error code 135 to be dependent on OS-A 107a is loaded to the register for temporal variable 125 and the instruction of comparison 144 is executed repeatedly. Detection of the equivalent error code explained here means that the common error code which means the same "memory error" is detected when an error code 135a to be dependent on OS-A 107a, for example, means the "memory error".

Here, it is assumed as the key-point that an error code is used in common in the execution environment-A 104a and execution environment-B 104b and the same error code is transferred to the execution program-A 110a and execution program-B 110b. Therefore, the following merits are assured for those who are describing the applications that the error code returned different OS is no longer changed and it is not required to modify coding to be dependent on the different OS.

Here, it should be noted that the error code 135 to be dependent on OS and the common error code 136 are not installed in a certain case within the constant area 134 but in the course of the program code 132 to be used to be independent on different OS depending on the execution development environment 104.

In the prior art explained above, since a layer to be independent on different OS is provided, easier transportation and description of applications can be provided to a user by defining the common error code to be independent on different OS. However, no consideration is taken into account in regard to implementation of the error code.

A reason is that ROM efficiency becomes bad because the common error code 136 is stored within the constant area 134 of ROM-A 122a, execution program code 131 and program code 132 to be used to be independent on different OS. This problem becomes more serious when the common error code 136 is defined with a value which requires larger storage area.

Therefore, it is effective to make the value of the common error code 136 small, but in this case, an additional problem is generated from the point of view of specifications of instruction set of CPU. Such problem will be explained as follows with reference to FIG. 4 to FIG. 7.

FIG. 4 is an explanatory diagram for zero promotion of a general register.

FIG. 5 is an explanatory diagram for a negative value of general register after the zero promotion.

FIG. 6 is an explanatory diagram for sign promotion of a general register.

FIG. 7 is an explanatory diagram for returning a value of general register after the sign promotion to an original value.

As the specifications of instruction set of CPU, it is specified that the zero promotion is first executed or the sign promotion is first executed on the occasion of storing a value which is comparatively smaller than the range of storage to the general register.

When a small value is loaded to the general register as the specification of an instruction set, the zero promotion is executed in some cases as shown in FIG. 4. In this case, the CPU 121α stores, in above example, a constant data which is a small positive value to the lower significant part 161 of the register 125 for return value or the register 125 for temporal variable and executes a job for zero promotion of the higher significant part 162 with only one instruction.

Moreover, as shown in FIG. 5, a process of the instruction 163 translating to complement on two (2) for zero (0) is necessary for the higher significant part in order to set a negative value to the general register after the zero promotion.

Therefore, in the case where a value of the common error code 136 is defined with a negative code even when a smaller value is set as such common error code 136 and moreover specification of instruction set for loading to the register specifies the zero promotion as explained above, it is required to add the instruction translating to complement on two (2) or the like and thereby the number of instructions in the execution program code-A 131a and program code to be used to be independent on different OS-A 132a increases as much, causing a problem that the ROM efficiency is lowered.

On the other hand, as shown in FIG. 6, the specification of a certain instruction set specifies the sign promotion for loading a small value to the general register. In this case, the CPU 121β stores, in above example, a constant data of a small positive value into the lower significant part 161 of the register for return value 126 or register for temporal variable 125. When a sign bit of small value is 0 (positive), the higher significant part of register is set to 0 and when it is 1 (negative), the higher significant part of register is set to 1. A series of these operations is executed with only one instruction.

FIG. 7 shows the process to return the value of general register after the negative sign promotion to an original value. If it is assumed that the MSB (Most Significant Bit) of the constant data of small value is one (1), a numerical value has different meanings depending on that this constant value data is assumed as the data without sign or as the data with sign.

When the constant value data of small value is the data without sign having the MSB of one (1) and the sign promotion is executed for such data as shown in FIG. 6, one (1) of the higher significant part must be set again to zero (0).

As explained above, when the specification of instruction set for loading to the register specifies the sign promotion as explained above even by making smaller the value of common error code 136 and defining the value of the common error code 136 with the code without sign, it is required to add the instruction 165 for packing 0 to the higher significant part or the like and thereby generating a problem that the number of instructions of the execution program code-A 131a and program code to be used to be independent on different OS-A 132a increases and the ROM efficiency is deteriorated.

The present invention is proposed to solve the problems explained above and it is therefore an object of the present invention to provide a computing system construction method which can improve the ROM efficiency for implementation of the common code without any useless insertion of instructions, while fully utilizing the existing instruction set system on the occasion of returning the error code to the application program which is executed under the environment to be dependent on different OS of the computing system.

SUMMARY OF THE INVENTION

The present invention employs a means, in order to realize the condition in which it is not required to store the common error code 136 defined to be independent on different OS into the constant area 134, for setting the return value from the program code 132 to be used to be independent on different OS and the value of common error code 136 to the identical value in the range embedded in the instruction 181 to load immediate value which can be executed with the CPU 121.

Moreover, in the case where a smaller value is loaded to the general register as the specification of instruction set, the common error code 136 is defined as a positive data without sign in order to attain the condition where it is not required to add the instruction translating to complement on two (2) 163 or the like when the zero promotion is executed.

Namely, it is no longer required to add the instruction translating to complement on two (2) 163 by defining the common error code 136 as the positive data without sign.

Therefore, it is not required to add such instructions in the execution program code 131 and program code 132 to be used to be independent on different OS, the ROM efficiency can be improved and it is also not required to execute such instructions. As a result, deterioration of performance can be prevented.

Moreover, when a small value is loaded to the general register as the specification of instruction set, a value of the common error code 136 is set within the range of numerical value in which the MSB of a part of setting immediate value 182 can be expressed as zero (0) in order to make it unnecessary to add the instruction embedded by zero value under the condition that the sign promotion is executed.

As explained above, it is no longer required to add the instruction embedded by zero value 165 by setting the value of the common error code 136 to the range of numerical value in which the MSB of the part of setting immediate value 182 can be expressed as zero (0).

Accordingly, it is not required to consider the addition of the instruction embedded by zero value 165 by defining the common error code 136 to the value within the range where the MSB of the part of setting immediate value 182 can be expressed as zero (0).

As a result, it is not required to add such instruction in the execution program code 131 and program code 132 to be used to be independent on different OS and thereby the ROM efficiency can be improved and such instruction is not required to be executed. Thereby, deterioration of performance can also be prevented.

The setting of the common error code 136 as explained above enables improvement of the ROM efficiency without any addition of the machine instruction to the execution program code 131 and program code 132 to be used to be independent on different OS for the CPU 121 which is provided with the instruction to load immediate value as the instruction set and also without increase of capacity of the constant area 134.

BRIEF DESCRIPTION OF THE DRAWINGS

FIG. 3 is a diagram showing a relationship among data, program code, register and memory or the like processed in the computing system-A105a.

FIG. 13 is a diagram showing a practical example of the common error code in relation to the computing system construction method of the present invention.

DETAILED DESCRIPTION OF THE PREFERRED EMBODIMENTS

A preferred embodiment of the present invention will be explained with reference to FIG. 8 to FIG. 16.

[Development Environment and Hardware]

First, the software developer's environment of the computing system construction method under the execution environment to be dependent on different OS of the present invention and a hardware for operating such environment will be explained with reference to FIG. 8 and FIG. 9. In this embodiment, it is assumed that the source program has been described in C language.

Figure 8:
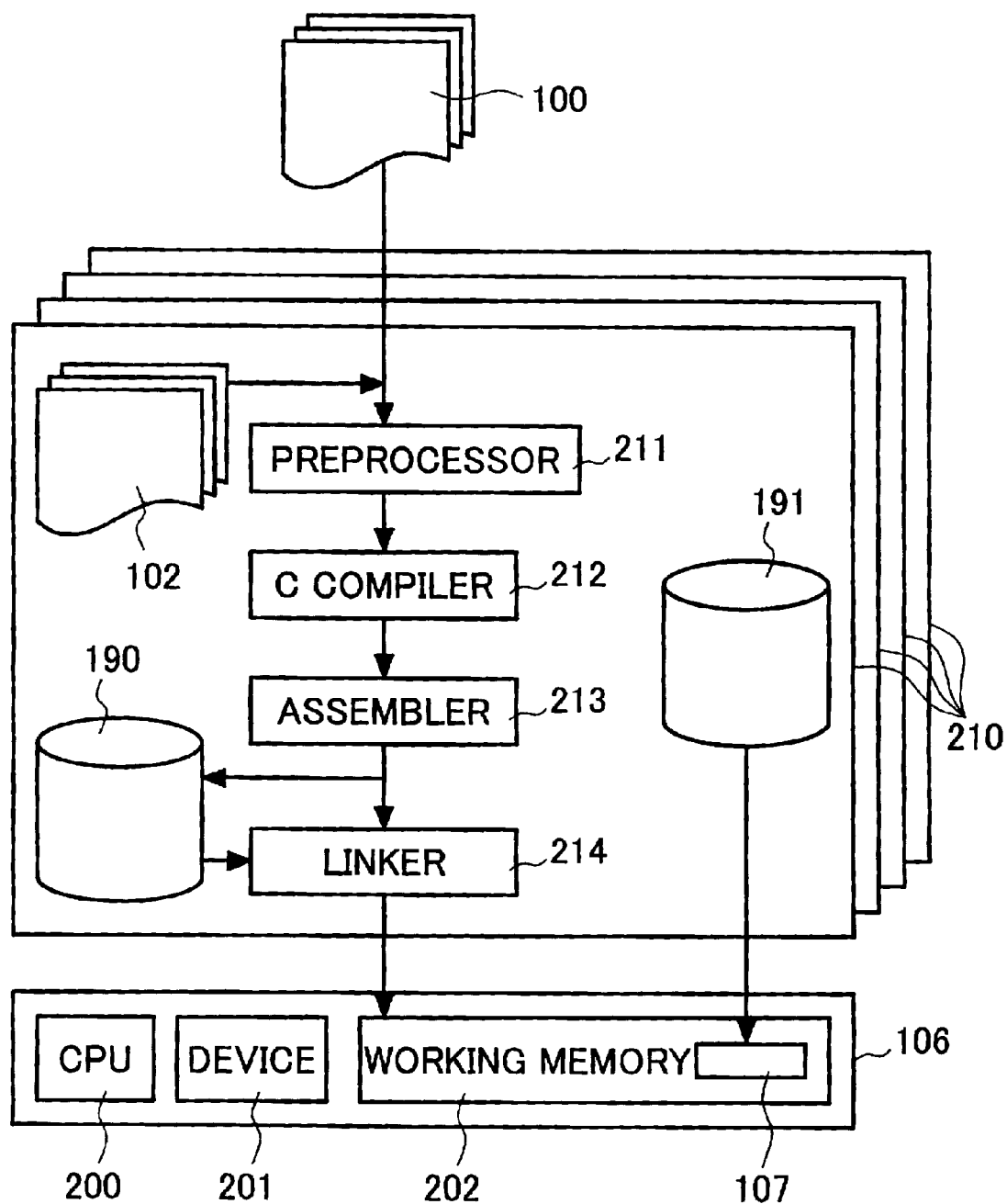
FIG. 8 is a diagram for explaining the flow of process in the software developer's environment of the computing system construction method under the execution environment to be dependent on different OS of the present invention.

FIG. 8 is a diagram for explaining the flow of process in the software developer's environment of the computing system construction method under the execution environment to be dependent on different OS of the present invention.

Figure 9:
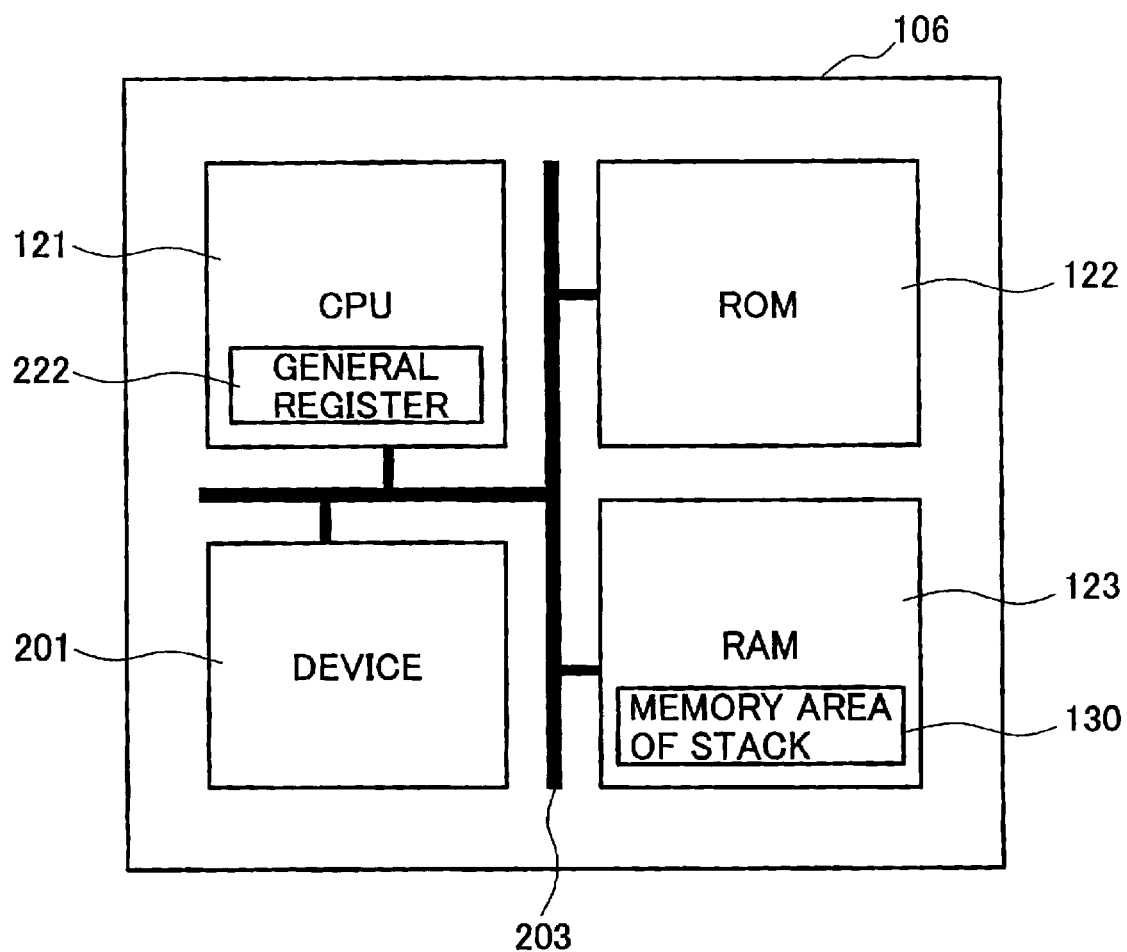
FIG. 9 is a hardware structural diagram for executing the computing system construction method under the execution environment to be dependent on different OS of the present invention.

FIG. 9 is a hardware structural diagram for executing the computing system construction method under the execution environment to be dependent on different OS of the present invention.

The present invention is based on the developer's environment to be dependent on a plurality of OSs.

A software developer inputs a body of application 100 described with the application program and a source code of the common function 102 to generate, dependent on the usual development procedure, an execution program using a preprocessor 211, a compiler for C programming language 212, an assembler 213 and a software tool called a linker 214.

The preprocessor 211 is a tool used to execute preprocess provided before the compiler for C programming language which processes and skips the data, comprises the other program and executes the macro definition process or the like depending on the conditions. The compiler for C programming language 212 executes syntax analysis and meaning analysis to the described text code to generate an adequate assembler code. An assembler 213 is a tool for converting the assembler code to a machine instruction to be executed by the CPU 121.

The linker 214 selects an adequate program code from a library 190, combines several kinds of program code files and finally generates an execution program to be executed on the hardware. In an example of this embodiment, the execution program code 131 obtained by compiling the body of application 100, the program code to be used to be dependent on different OS 132, the necessary module such as code of OS and data part such as constant area 134 and the stack area 130 are combined to generate an executable module to be actually executed by the CPU 121. This library 190 includes the execution environment program code existing in the executable environment and the linker 214 fetches the adequate program depending on the function for the purpose of combining.

An OS configurater 191 is a software tool to generate a program code of the OS 107 which is customized when an application software developer selects and sets the various target functions of OS 107.

The hardware 106 is structured with the CPU 121, device 201 and working memory 202.

Finally, the execution program and OS107 to be executed on the CPU121 are allocated in the working memory 202.

The working memory 202 is composed of ROM and RAM to store, as the executable modules, the execution program of user, program to be used to be dependent on different OS and module of OS. Moreover, as the data, the constant area 134 and stack area 130 are stored.

The software developer's environment in this embodiment may be loaded on a main frame, a personal computer and a general computer such as a work station or the like.

The procedures for generating the hardware 106 which can operate finally the execution programs are as follows.

Namely, an application software developer selects the program developer's environment 210 for each OS corresponding to the target OS 107 which is defined on the general purpose computer. Thereafter, the developer generates the program code of the OS 107 customized using the OS configurater 191 accompanying to the selected program developer's environment 210 for each OS.

Next, the entire part of the program code formed by linking the OS program code 133 of the relevant OS 107, execution program code 131 and the program code to be used to be independent on different OS 132 is built into the working memory 202. Moreover, it is also possible that the program code which has been formed later by linking the execution program code 131 and program code 132 to be used to be independent on different OS is built into the working memory 202 to which the OS program code 133 of OS 107 is previously loaded in order to realize the execution of such program code through the dynamic linking.

Here, it is enough when the hardware 106 is provided with a mechanism to execute the execution program but in this embodiment, a system LSI where a program is mainly loaded into the working memory is assumed as such mechanism.

An example of the structure of this hardware 106 will be explained in detail with reference to FIG. 9.

Figure 1:
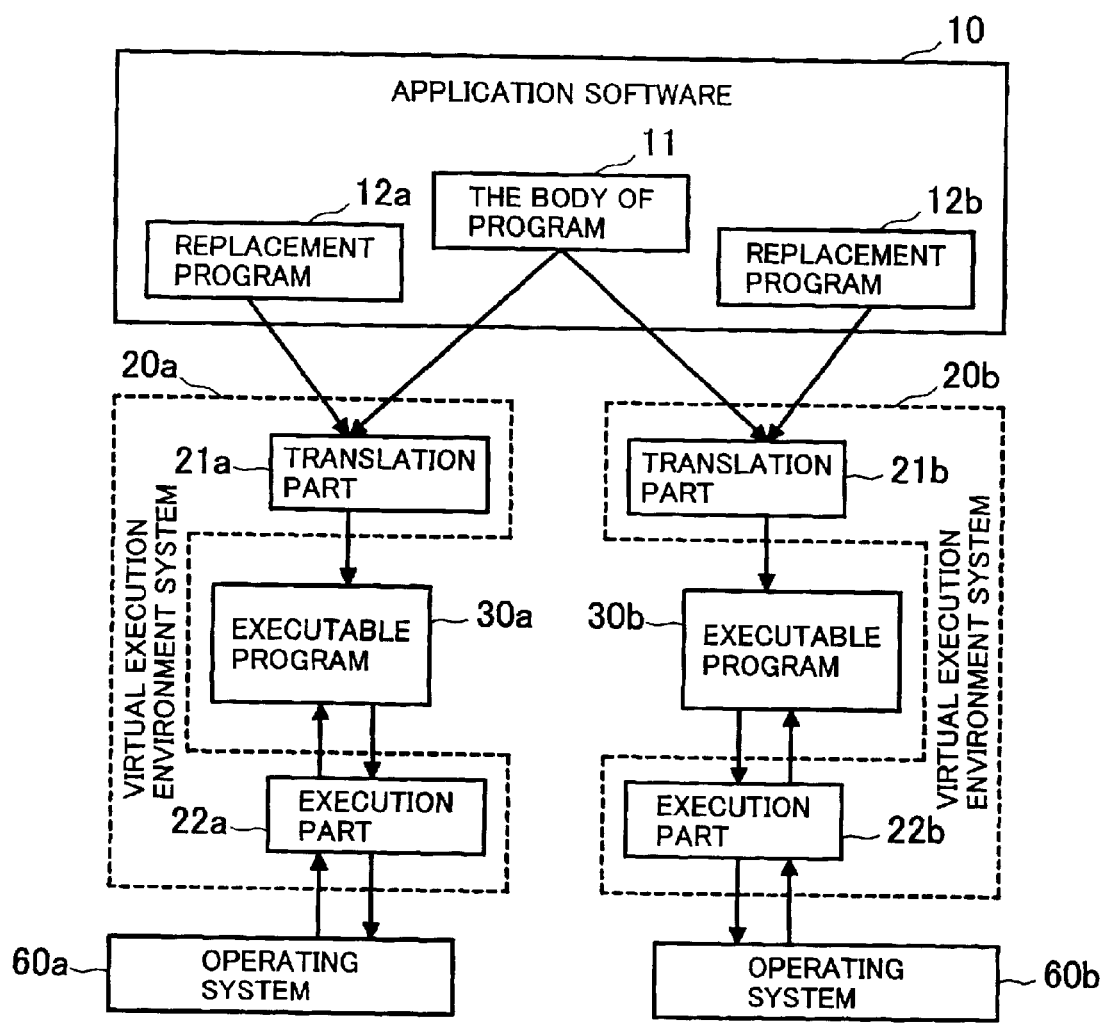
FIG. 1 is a schematic diagram of a "Virtual Execution Environment System" of the official gazette of the Japanese Published Unexamined Patent Application No. HEI 8-63363.
Figure 2:
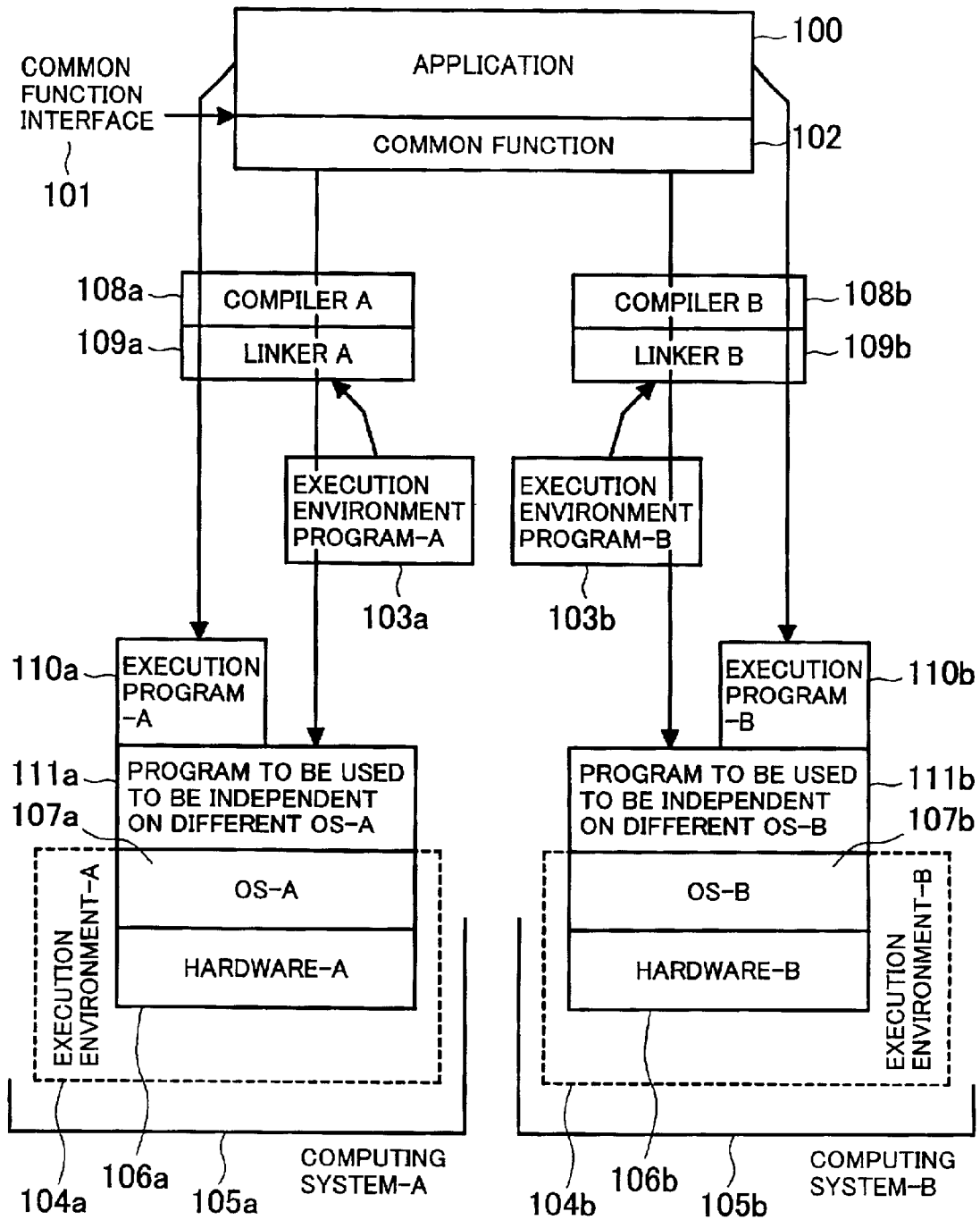
FIG. 2 is a conception diagram for software development under the execution environment to be dependent on different OS.
Figure 3:
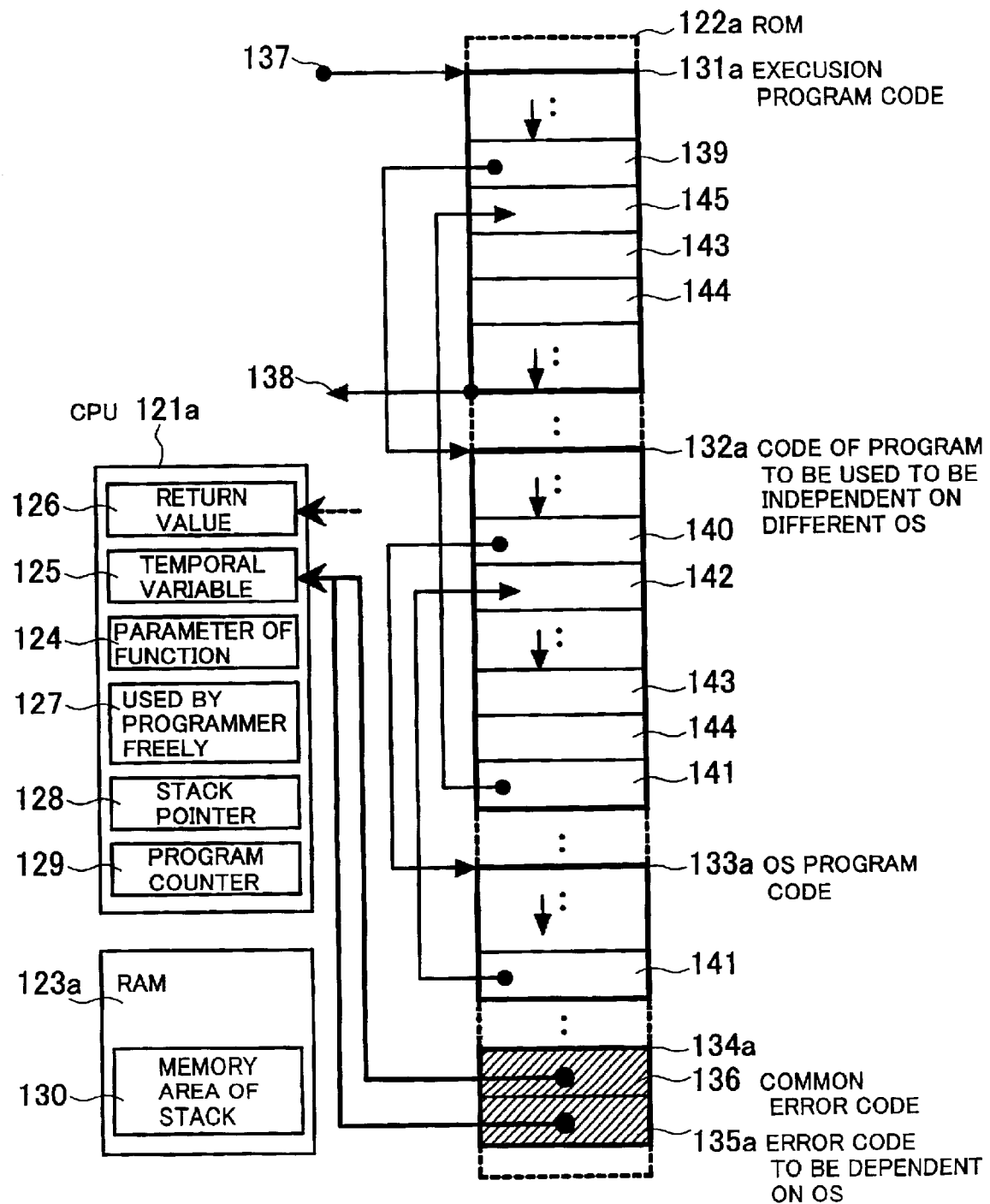

The CPU 121 is a main component of the hardware 106 to execute instructions and executes various arithmetic calculations and is provided with a general register group 222 explained with reference to FIG. 3. This general register group 222 includes the register for parameter of function 124, register for temporal variable 125, register for return value 126, register used by programmer freely 127, stack pointer register 128 and program counter register 129 or the like.

The RAM 123 is a memory area allowing the programming whenever it is required. This RAM 123 is provided with a stack area 205. The ROM 122 is a read-only memory area which usually does not allow the programming. For example, information can be written only when an LSI is manufactured and the information can be read from this memory area only when usual execution is carried out. The ROM 122 is provided with the constant area 134. To a part of the ROM 203b or RAM 123, the execution program 110, program to be used independent on different OS 111 and program code of OS are comprised. These programs and program code are read and executed by the CPU 121.

The device 201 is a component of hardware 106 having various functions. When the system LSI is used as the hardware 106, this device 201 is formed on the LSI as the processing circuit having special functions. As the practical circuits, I/O (Input/Output), ASIC (Application Specific Integrated Circuits), FPGA (Field Programmable Gate Arrays), DSP (Digital Signal Processor) may be listed.

The I/O is, for example, an A/D converter, D/A converter, RS-232C processing circuit, SCSI processing circuit. ASIC is, for example, MPEG, Video encoder and exclusive processing circuit such as MP3 decoder or the like. FPGA is an IC which can vary the hardware structure. DSP is an IC for processing only the digital signal.

These components are used to exchange pieces of information through a bus 203 which is a common signal transmitting line.

[Instruction To Load Immediate Value]

The present invention is characterized in that the instruction to load immediate value is used to return the common error code in the layer to be used to be dependent on different OS. Therefore, a format and a function of the instruction to load immediate value will be explained next with reference to FIG. 10 to FIG. 12.

Figure 10:
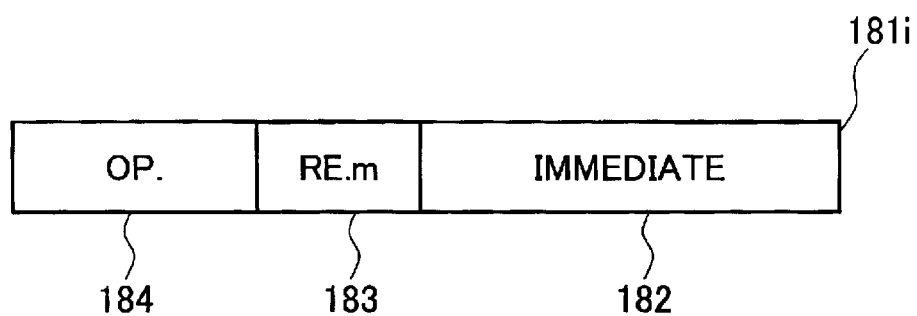
FIG. 10 is a diagram showing a format of the instruction to load immediate value.

FIG. 10 is a diagram showing a format of the instruction to load immediate value.

Figure 11:
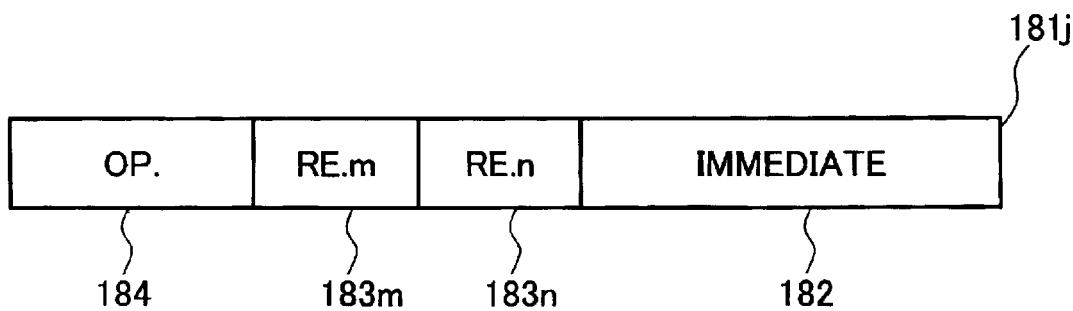
FIG. 11 is a diagram showing the other format of the instruction to load immediate value.

FIG. 11 is a diagram showing the other format of the instruction to load immediate value.

Figure 12:
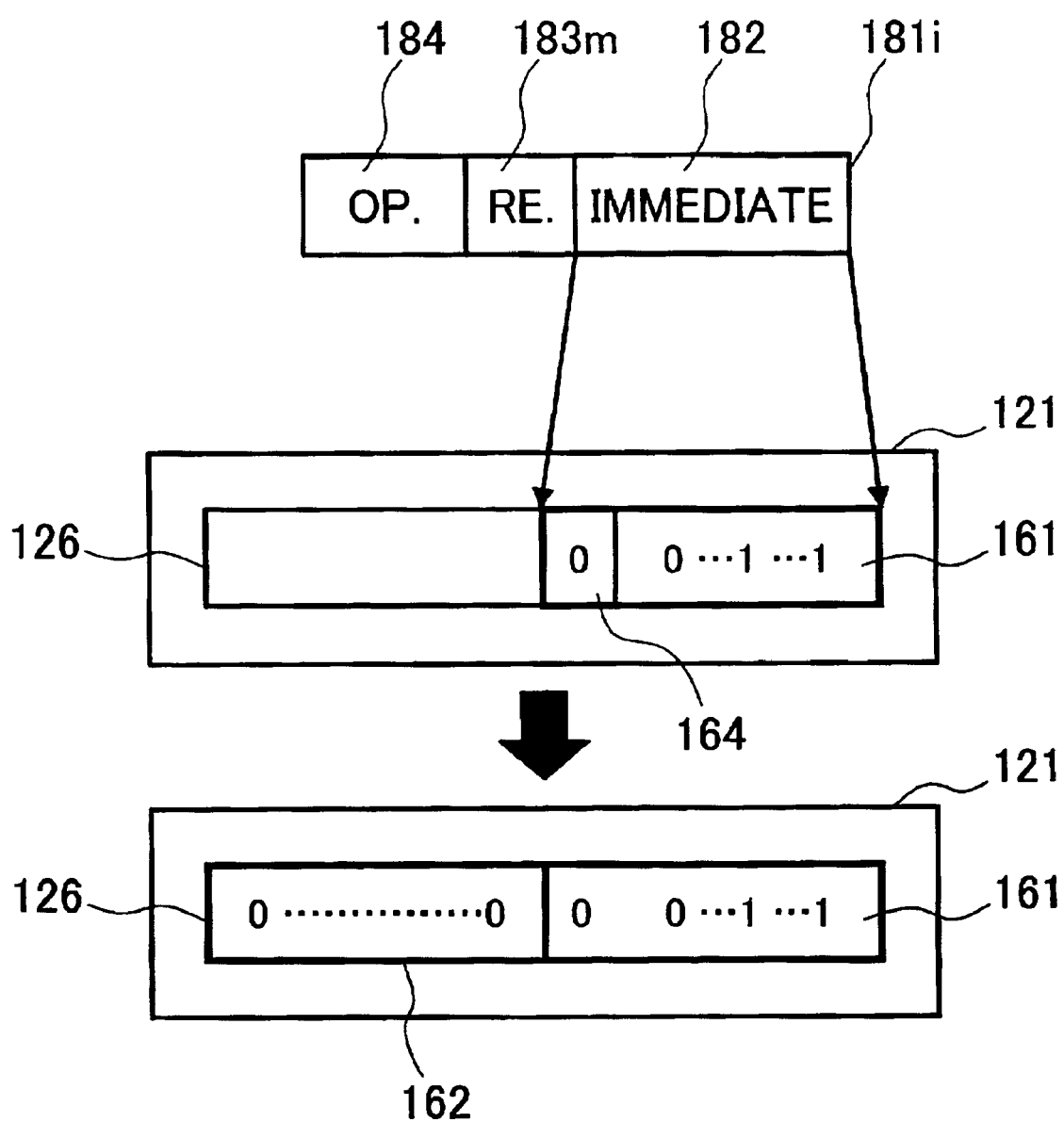
FIG. 12 is a diagram showing a relationship between the common error code and instruction to load immediate value in the computing system construction method of the present invention.

FIG. 12 is a diagram showing a relationship between the common error code and instruction to load immediate value in the computing system construction method of the present invention.

The instruction to load immediate value 181i is used to bring about an immediate value (constant value data) to the designated register. The format as the instruction word is structured, for example, with an immediate value setting part 182, a selector part of general register 182 and an operand code part 184. The operand code part 184 is used to set the code indicating a kind and a function of instruction. The selector part of general register 183 is used to designate the number of a register to be loaded. The immediate value setting part 182 is used to hold the immediate value.

The CPU 121 determines, from the operand code part 184, that the kind and function of instruction correspond to that of the instruction to load immediate value 181 and stores the immediate value designated in the immediate value setting part 182 to the general register designated with the selector part of the general register 183.

Therefore, when a value of the common error code 136 and a return value of the program code 132 to be used to be independent on different OS are defined, before the compiling, as the values in the range to be processed with the immediate value setting part 182, the compiler 108 for C programming language, for example, generates the instruction to load immediate value 181 to hold the common error code 136 of the instruction to be set to the register for setting the return value to the immediate value setting part 182 in order to return, to the application described by a user, the common error code 136 to be used to be independent on different OS in place of the instruction to load constant area data 143.

In the present invention, as shown in FIG. 12, the common error code 136 is defined in the immediate value setting part 182 of the instruction to load immediate value 181 and it is then set to the range of a positive value to indicate the MSB of the immediate value setting part 182 as 0.

Moreover, as an instruction set of the CPU, an instruction 181j to load immediate value in the format shown in FIG. 11 to set a plurality of general registers to be loaded can also be used in addition to the instruction to load immediate value 181i of the format shown in FIG. 10. But this instruction to load immediate value 181j can be used in the same manner as the instruction to load immediate value 181i in order to set the common error code 136.

[Practical Example of Common Error Code]

Next, a practical example of the common error code to be set in the present invention will be explained with reference to FIG. 13.

FIG. 13 is a diagram showing a practical example of the common error code in relation to the computing system construction method of the present invention.

The common error code shown in FIG. 13 can be assumed to have the length, for example, of 1-byte length or 2-byte length as the selector part 182 of immediate value of the instruction to load immediate value 181.

[Relationship Between Program Code and Instruction to Load Immediate Value]

Next, a relationship between the program code and instruction to load immediate value will be explained with reference to FIG. 14.

Figure 14:
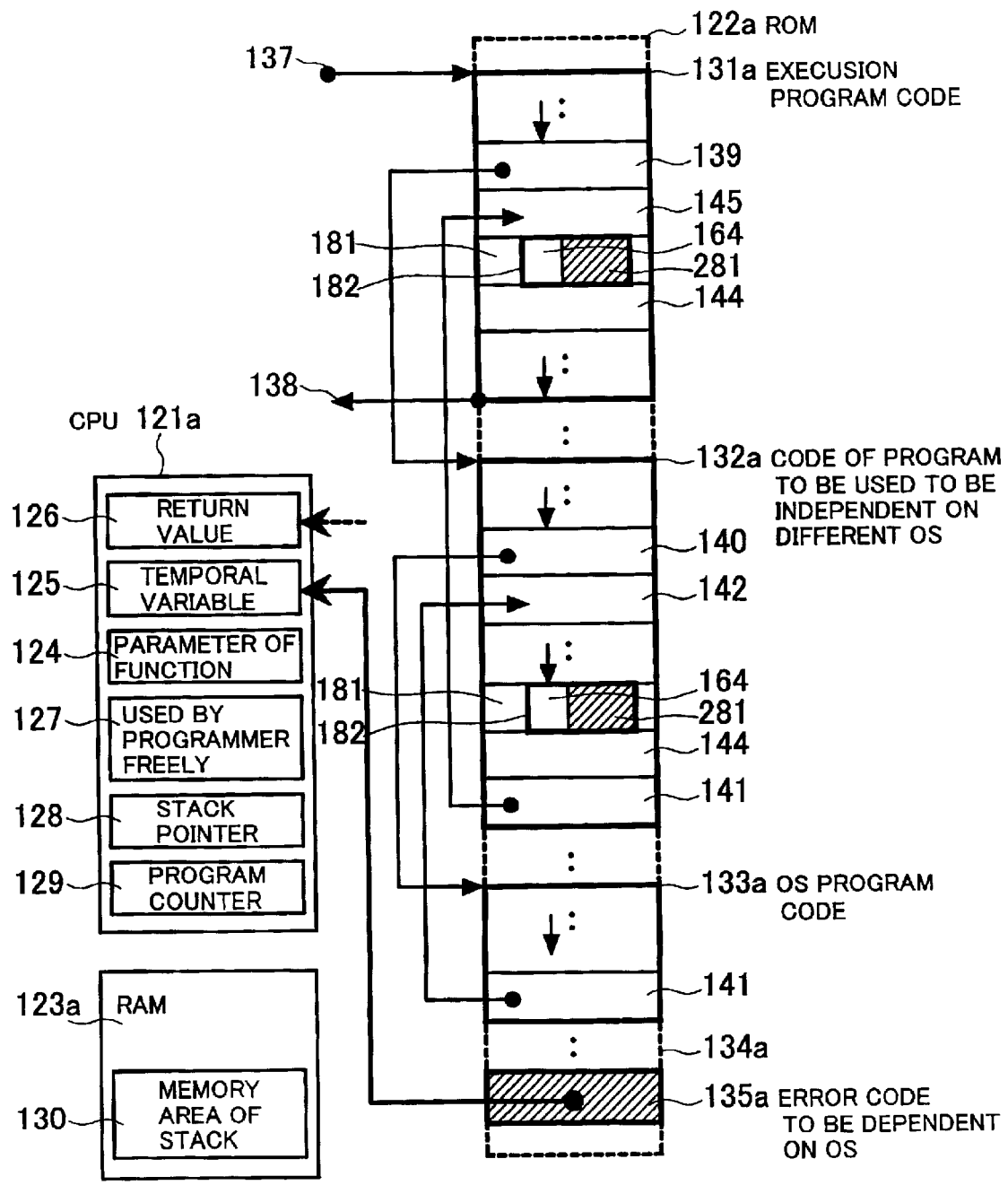
FIG. 14 is a diagram showing a relationship among data, program code, register and memory or the like to be processed with the computing system-A 105a when the instruction to load immediate value is embedded in the program code.

FIG. 14 is a diagram showing a relationship between data, program code and register, memory or the like to be dealt with the computing system-A 105a when the instruction to load immediate value is embedded in the program code.

The execution program code 131 is an executable module formed by compiling the body of application, while the program code 132 to be used to be independent on different OS is an executable module formed by compiling the common function and linking the necessary modules. These executable modules are loaded on the ROM 122 or RAM 123 of the hardware 106.

Figure 4:
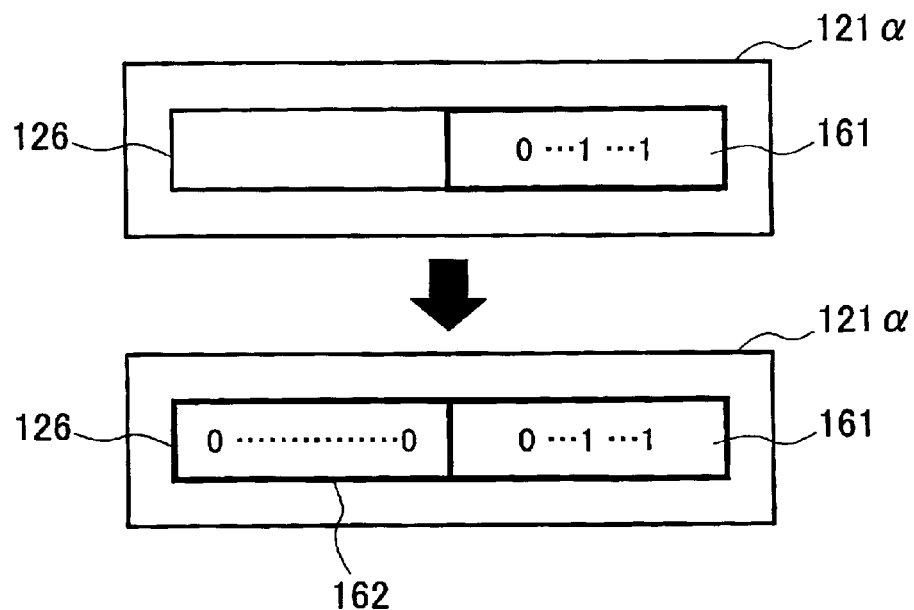
FIG. 4 is an explanatory diagram for zero promotion in a general register.
Figure 5:
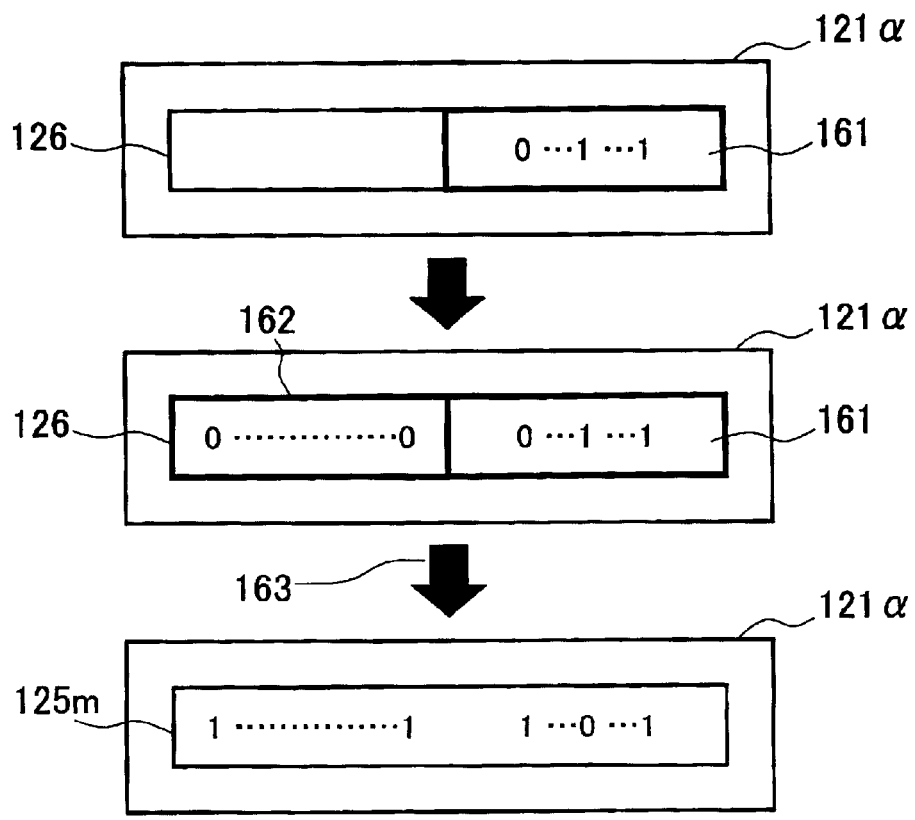
FIG. 5 is an explanatory diagram for setting a value of general register after the zero promotion to a negative value.
Figure 6A:
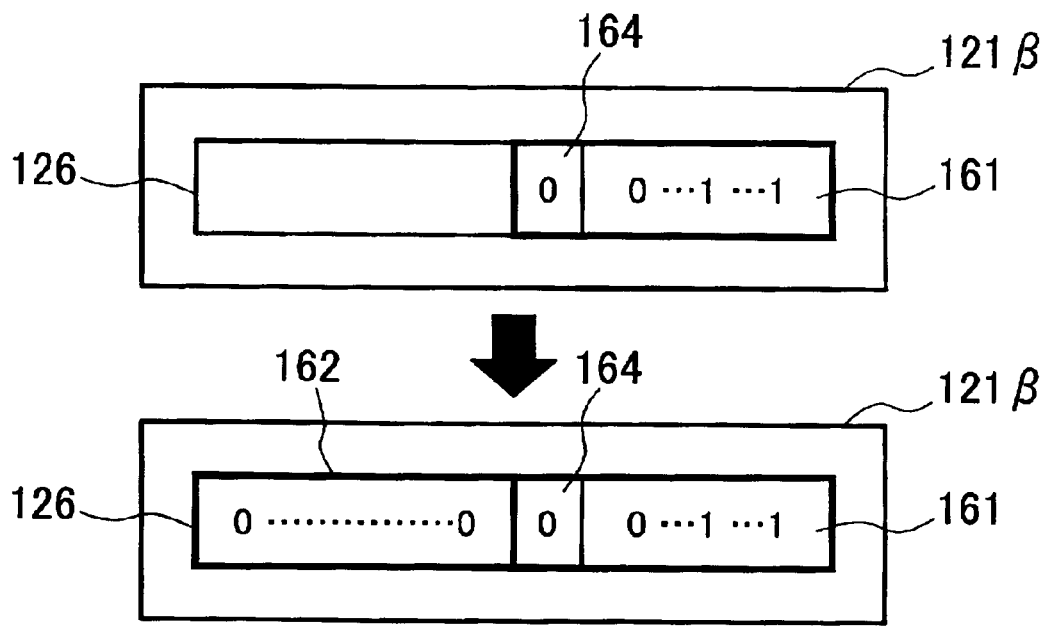
FIG. 6 is an explanatory diagram for sign promotion with a general register.
Figure 6B:
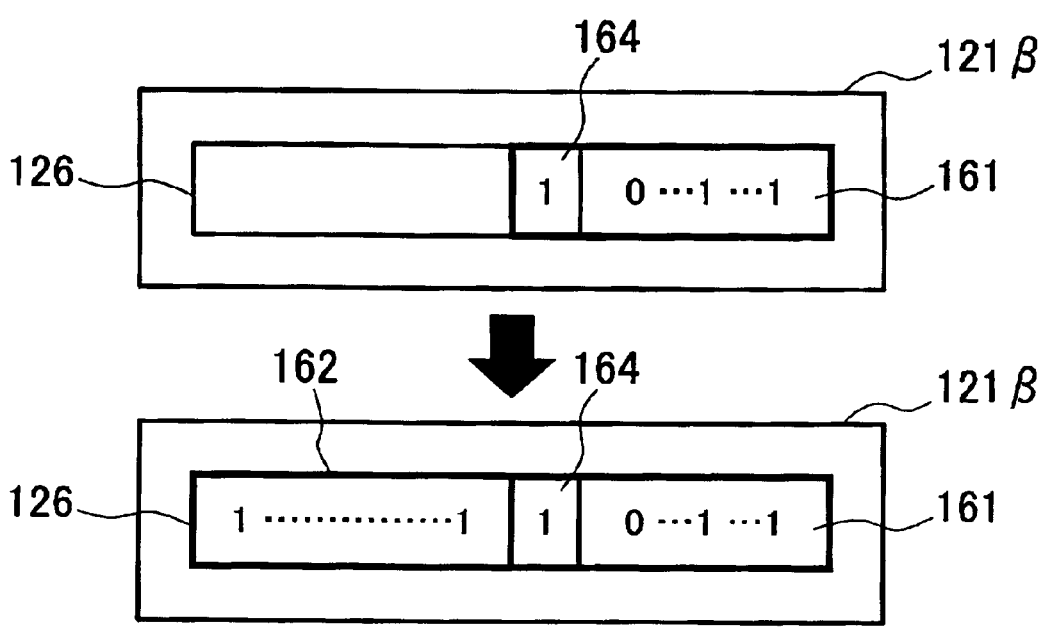
Figure 7:
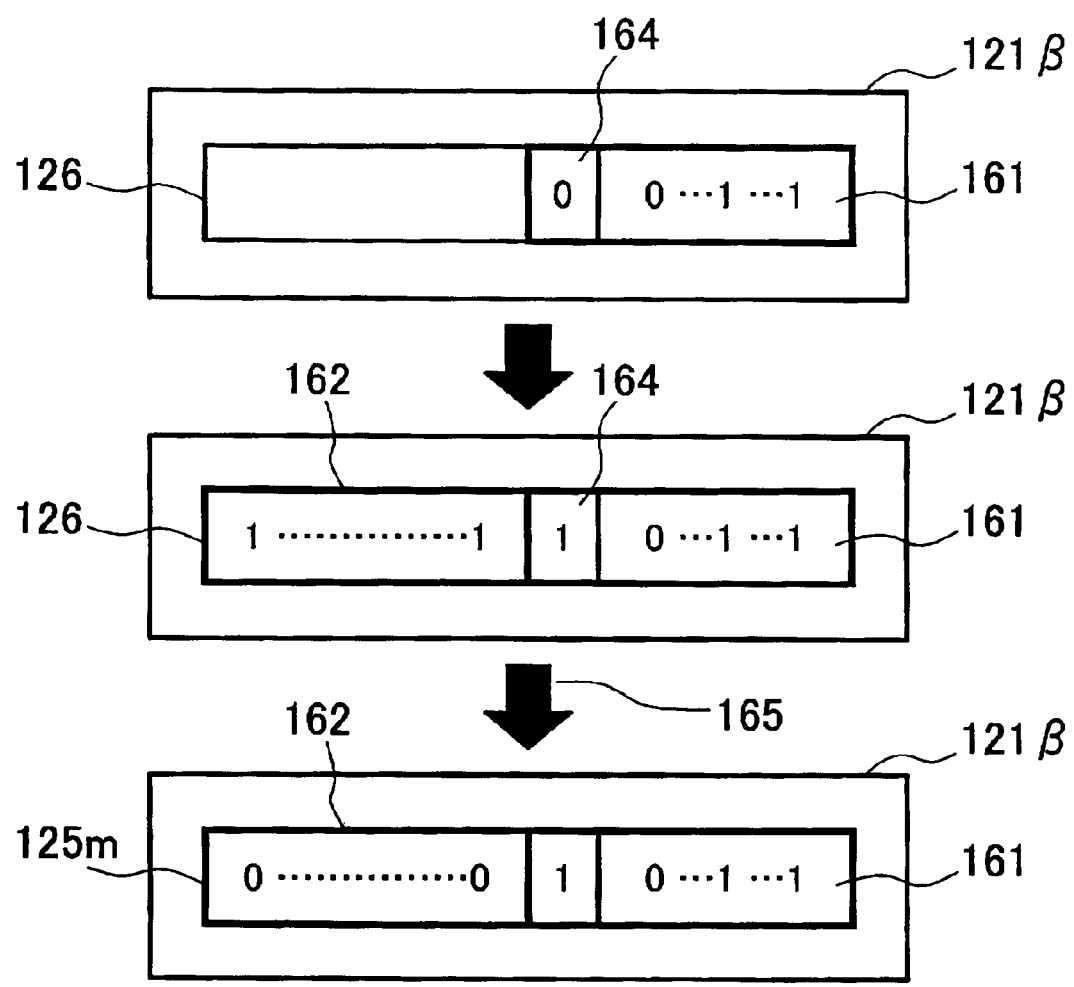
FIG. 7 is an explanatory diagram for returning a value of general register after the sign promotion to an original value.

For the execution program code 131 and program code to be used to be independent on different OS 132 shown in FIG. 14, the instruction to load immediate value 181 is used in place of the instruction to load constant area data 143 explained with reference to FIG. 4. In the selector part of immediate value 182 within the instruction to load immediate value 181, the MSB 164 is set to 0. In the immediate value part 281 other than the MSB 164, the common error code 136 determined with the common interface 102 is embedded.

Therefore, in this case, it is no longer required to hold the common error code to the constant area.

[Example of Source Program Written in C Language]

Next, an example of the source program written in C language prepared in the software developer's environment of the computing system construction method of the present invention will be explained with reference to FIG. 15 and FIG. 16.

Figure 15:
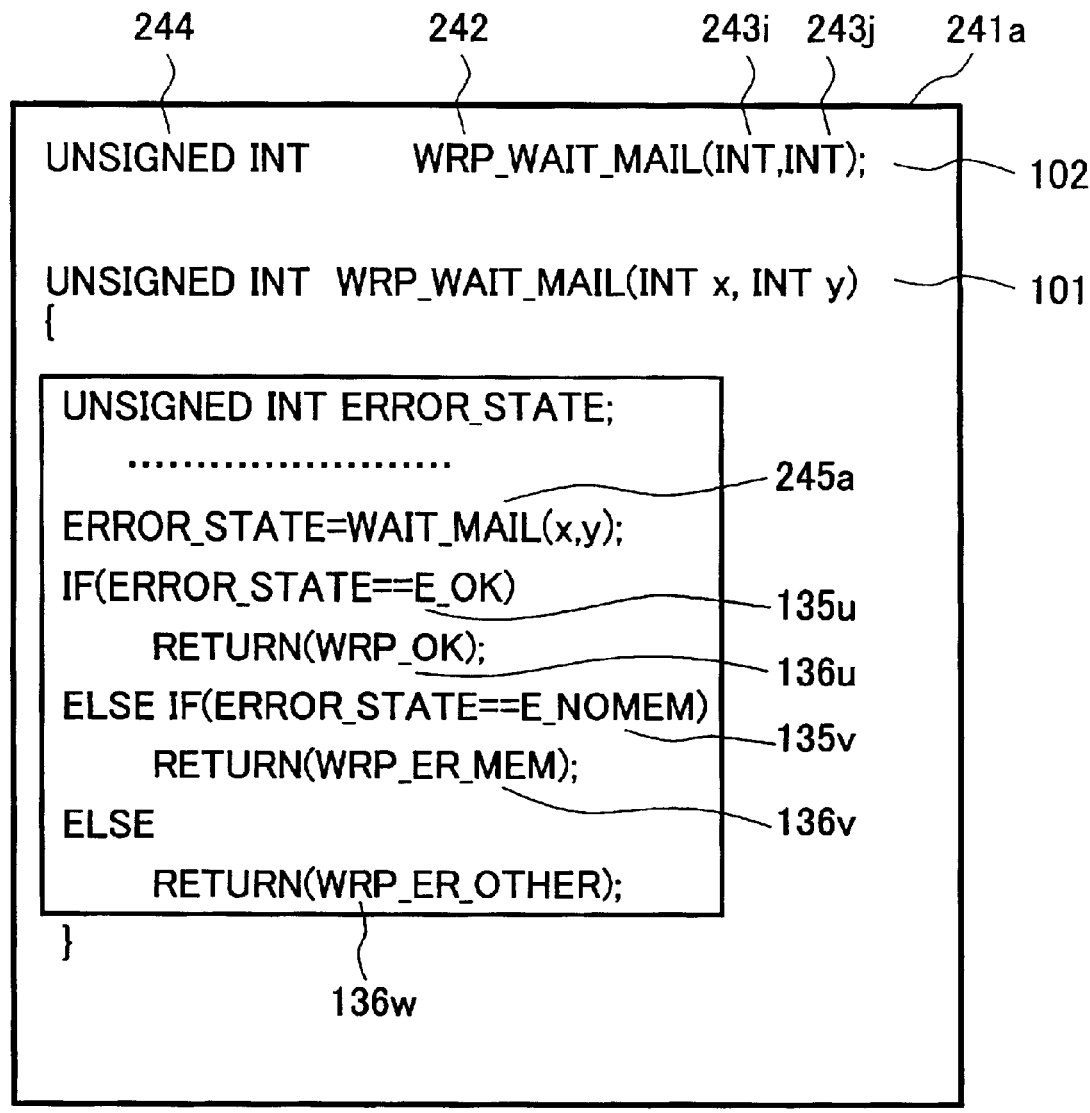
FIG. 15 is a diagram showing an example of the source program by C programming language of the common function under the development environment of the present invention.

FIG. 15 is a diagram showing an example of the source program written in C language of the common function of the software developer's environment of the present invention.

Figure 16:
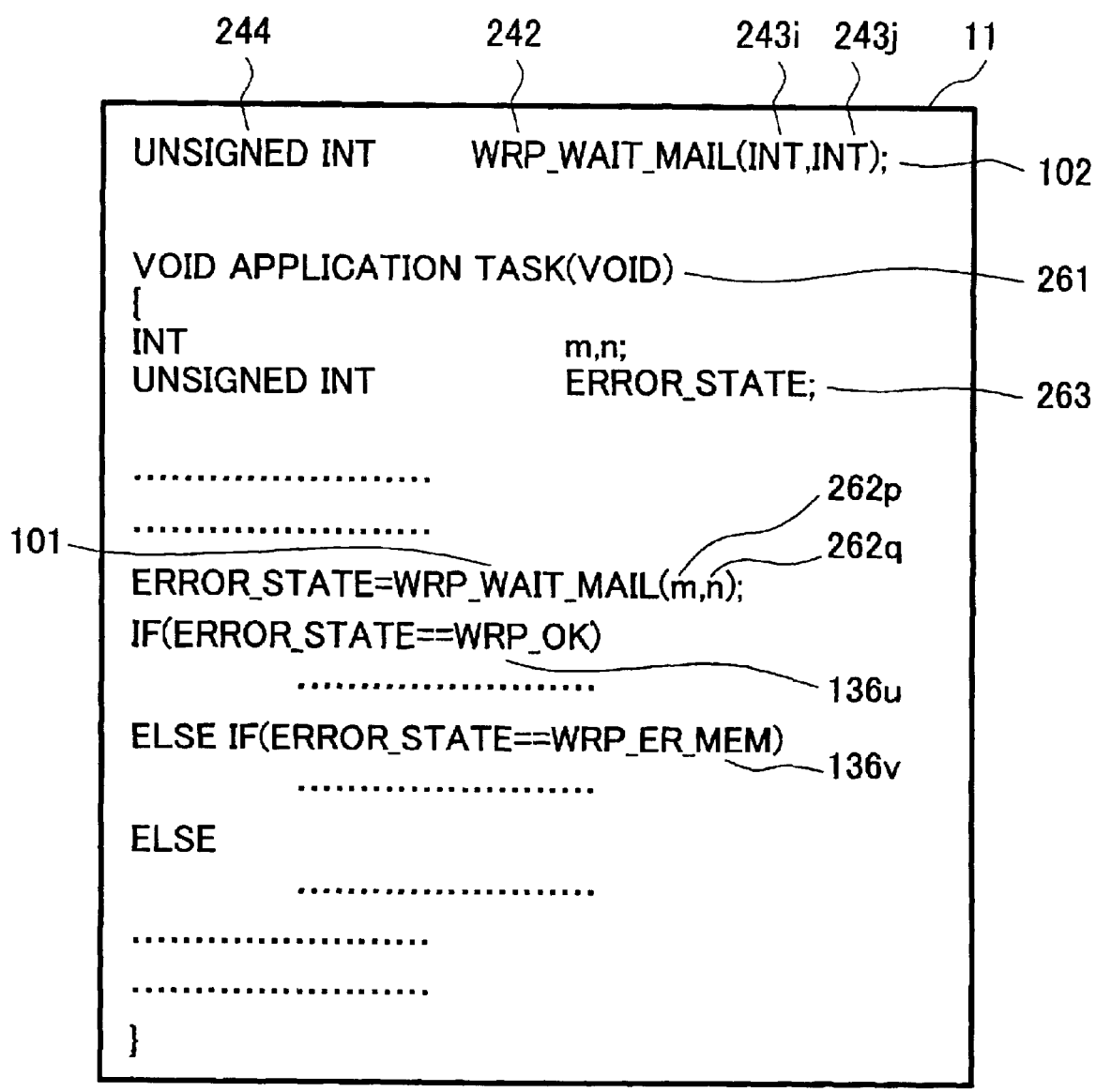
FIG. 16 is a diagram showing an example of the source program by C programming language of the application software under the development environment of the present invention.

FIG. 16 is a diagram showing an example of the source program written in C language of the application software of the software developer's environment of the present invention.

The common function is a function to provide the functions of system to a user and makes public the common interface 102 as the function interface for users.

The common interface 102 substantially defines functions in the specifications of C programming language and defines an interface function name 242, a type of data of function parameter 243 and a type of data of return value 244. In an example shown in FIG. 15, the interface function name 242 is "WPR__Wait__Mail" including two function parameters, the type of data of function parameter 243 is type "int" and the type of data of return value 244 is type "unsigned int".

The source program 241 written in C language of the common function is coded to be dependent on different OS. For example, for the operation on the execution developer's environment-A 104a of the computing system-A 105a, the coding for calling the system call 245a of OS-A 107a is executed. Moreover, for the operation on the execution developer's environment-B 104b of the computing system-B 105b, the coding for calling the system call 245a of OS-B 107b is executed.

As explained above, difference of execution environment can be shielded from a user by using the common function 101 and it will be enough from the viewpoint of user application to pay attention only to the common interface 102 and the functions of such arithmetic function.

As the internal process of the common function 101 to be operated on the execution developer's environment-A104a, the predetermined process is executed, for example, through the system call 245a as shown in FIG. 15. As a result, the error codes 135u, 135v dependent on the OS-A 107a of the system call returned from the OS-A 107a are determined and the common error codes 136u, 136v, 136w defined by the common interface 102 are returned as the return value from the common function 101. As explained above, as the numerical value of the common error code 136, the common definition which is not dependent on the execution developer's environment 104 and computing system 105 is used.

Since a value of the common error code 136 is defined to be within the range of numerical value indicating the MSB of the immediate value setting part 182 as 0 and not to be given any sign, it is declared as the unsigned type which is at least used as the type of data in the specification of C programming language together with the type of data 244 of return value. Length of the common function 101 of FIG. 15 is set in the same bit length of the general register group 222 and the unsigned int type description is introduced, but it is also possible that the common error code 136 is defined shorter than the bit length of the general register group 222 of the unsigned short type and unsigned char type.

Next, the source program written with the C programming language of the application software to call this common function 101 is shown in FIG. 16. In this example, the application program function 261 "ApplicationTask" calls the common function 101 "WPR_Wait_Mail".

This application program function 261 only calls the common function 101 in the internal side and does not allow the coding dependent on the execution environment. Therefore, it is no longer required at all to be aware of execution environment, OS and computer for execution for development of application level.

In an example of FIG. 16, the application program function 261 "ApplicationTask" calls the common function 101 "WPR_Wait_Mail", sets the return value to a variable "error_state" 263 and thereafter determines the common error code 136u or 136v to which such return value corresponds and thereafter branches the process. A type of variable for setting the return value to "error_state" is naturally same as the type of return value of common function 101 "WPR_Wait_Mail" and is equivalent to the unsigned int type defined by the common error code 136. Moreover, when the type of common error code 136 is the other unsigned short type or unsigned char type or the like, it is stored in its declared variable 263. The variable 263 is loaded, as a local variable and a temporary variable, with the program developer's environment 201 for each OS to the stack area 130 or to the RAM area other than the stack area 130, depending on whether the local variable or global variable of the specification by the C programming language is declared with the application program function 261 or not.

As can be understood from the explanation of this embodiment, the present invention is characterized in that a system of the existing instruction set is fully utilized in view of improving the ROM efficiency for implementation of its common code and thereby useless insertion of instruction may be eliminated on the occasion of returning an error code to the application program to be used in different execution environment of the computing system.

What is claimed is:

1. A computing system comprising:
   a CPU including a general register as hardware and executing an operating system;
   wherein an instruction set of said CPU includes an instruction to load immediate value for storing an immediate value to said general register;
   wherein said CPU executes an execution program corresponding to an application program and a program absorbing a difference between execution environments, and outputs
   a common error code to be independent on execution environment when the operation is returned from the program absorbing a difference between execution environments to the execution program corresponding to said application program;
   wherein said common error is a value within a numerical range which can be set with said instruction to load immediate value, and
   is held within the instruction code of said instruction to load immediate value.

2. A computing system according to claim 1, wherein said common error code is determined within a range of a numerical value where the most significant bit (MSB) of said immediate value is set to zero (0).

3. A computing system according to claim 1, wherein said common error code is determined with a positive value without any sign,
   wherein said CPU automatically performs sign extension for the leading part of data when data which is smaller than the number of bits of said general register is loaded to said general register.

4. A computing system according to claim 1, wherein said common error code is determined within a range of the numerical value to set the most significant bit MSB of said immediate value to zero (0),
   wherein said CPU automatically performs a sign extension for the leading part of data when data which is smaller than the number of bits of said general register is loaded to said general register.

* * * * *